United States Patent
Sims et al.

(10) Patent No.: US 6,347,762 B1
(45) Date of Patent: Feb. 19, 2002

(54) MULTISPECTRAL-HYPERSPECTRAL SENSING SYSTEM

(75) Inventors: S. Richard F. Sims; William C. Pittman, both of Huntsville, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/853,923

(22) Filed: May 7, 2001

(51) Int. Cl.$^7$ .............................. F41G 7/00; G06K 9/00
(52) U.S. Cl. ...................... 244/3.17; 244/3.1; 89/41.06; 382/103; 250/334
(58) Field of Search ................................ 244/3.1, 3.17, 244/3.16; 89/41.06, 41.07; 382/103; 250/334, 340

(56) References Cited

U.S. PATENT DOCUMENTS

| | | | | |
|---|---|---|---|---|
| 6,008,492 A | * | 12/1999 | Slater et al. | 250/334 |
| 6,075,891 A | * | 6/2000 | Burman | 382/191 |
| 6,079,665 A | * | 6/2000 | Nella et al. | 244/3.17 |
| 6,211,906 B1 | * | 4/2001 | Sun | 348/144 |
| 6,282,301 B1 | * | 8/2001 | Haskett | 382/103 |

* cited by examiner

Primary Examiner—J. Woodrow Eldred
(74) Attorney, Agent, or Firm—Arthur H. Tischer; Freddie M. Bush; Hay Kyung Chang

(57) ABSTRACT

The Multispectral-Hyperspectral Sensing System (MHSS) comprises a control center, a surveillance platform and at least one weapon battery with known sensing and destroying capabilities. The control center has access to pre-existing information relating to the target scene and potential targets, although not necessarily current, as well as the capabilities and limitations of the available weapons. This pre-existing information is communicated to the surveillance platform to be used in collecting hyperspectral/multispectral image data of the target scenery and to derive from the collected image data the relevant current target data subset. The derived data subset is then down-linked to the control center, which performs further processing to make it useful to the selected weapon. The weapon receives the target signature update from the control center and, in response, performs a significantly more precise strike at the selected target than based just on the a priori knowledge base.

8 Claims, 2 Drawing Sheets

MULTISPECTRAL-HYPERSPECTRAL SENSING SYSTEM

DEDICATORY CLAUSE

The invention described herein may be manufactured, used and licensed by or for the Government for governmental purposes without the payment to us of any royalties thereon.

BACKGROUND OF THE INVENTION

The term "hyperspectral" for remote sensing applications is applied to the technology of acquiring hundreds of discrete, contiguous, narrow bands of data over the entire super band in which the sun provides illumination to the earth. On the other hand, the term "multispectral," in spite of its literal meaning, has in the past and does still usually refer to two spectrum bands that are not contiguous. Hyperspectral data acquisition in the visible, mid-infrared and long wavelength infrared can lead to a three-dimensional data cube that contains far more information than multispectral by itself. Current hyperspectral imaging sensors are capable of acquiring data in 10 nanometer bands, thus providing sufficient resolution to identify the specific materials composing the targeted objects.

The accurate detection, recognition and/or identification of targets from surveillance platforms, be they airborne or ground-based, is of ever-increasing significance in the modem battlefield where sophisticated camouflage and countermeasures run rampant. At present, the typical surveillance platform collects multiple electromagnetic spectra to help in the detection of targeted objects and any subsequent target discrimination. The fidelity of this process is dependent on the discrimination content of the multi-spectra information and, to a large extent, on the quality and fidelity of the individual sensor data. The information thus collected by the surveillance platforms has the potential to provide the current target signature, including the target location, which may be either stationary or dynamic. It is obvious that compatibility between the collected hyperspectral/multispectral data of the target scene and the selected weapon sensor is highly desirable if best use is to be made of the target data by the weapon to obtain tactical precision strike. Increased accuracy in target strike would also tend to negate the effects of camouflage and override intentional or serendipitous obscuration of the target.

However, the currently available weapon sensor is typically a broad-band focal plane array (FPA) that is not able to take full advantage of the information contained in the hyperspectral/multispectral data. Even in the newer FPA devices that have the capability to provide more than one band, the available bands are still relatively broad compared to the narrow, contiguous bands comprising the hyperspectral data. What is needed is a system that allows periodic updates of the target signature by manipulating the collected multispectral/hyperspectral data to derive from it a data subset that is most relevant to the selected target and at the same time most compatible with the capabilities of the selected weapon sensor and, further, allows the transmission of the data subset to the weapon via currently available data links.

SUMMARY OF THE INVENTION

The Multispectral-Hyperspectral Sensing System (MHSS) integrates a control center, a surveillance platform and at least one weapon battery whose sensing and destroying capabilities are known. The control center possesses some pre-existing information relative to the target scene and potential targets as well as the capabilities and limitations of the available weapon battery. This pre-existing information is communicated to the surveillance platform which takes it into account while selectively collecting hyperspectral/multispectral image data of the target scenery and derive from it the relevant data subset. The relevant data subset is then down-linked to the control center, which performs further processes to make it useful to the selected weapon. The weapon receives the target signature update from the control center and is enabled to make a more precise strike at the selected target with much reduced collateral damage and time lapse between the target sensing and target destruction.

DESCRIPTION OF THE PREFERRED EMBODIMENT

Even though the description of the Multispectral-Hyperspectral Sensing System (MHSS) is given from the perspective of military applications, it is noted that MHSS can be equally useful in civilian applications in the detection, recognition and identification of any particular object (such as missing campers or hikers in the woods or an errant commercial airplane in the skies) and ultimate contact with the object, if desired.

Figure 1:
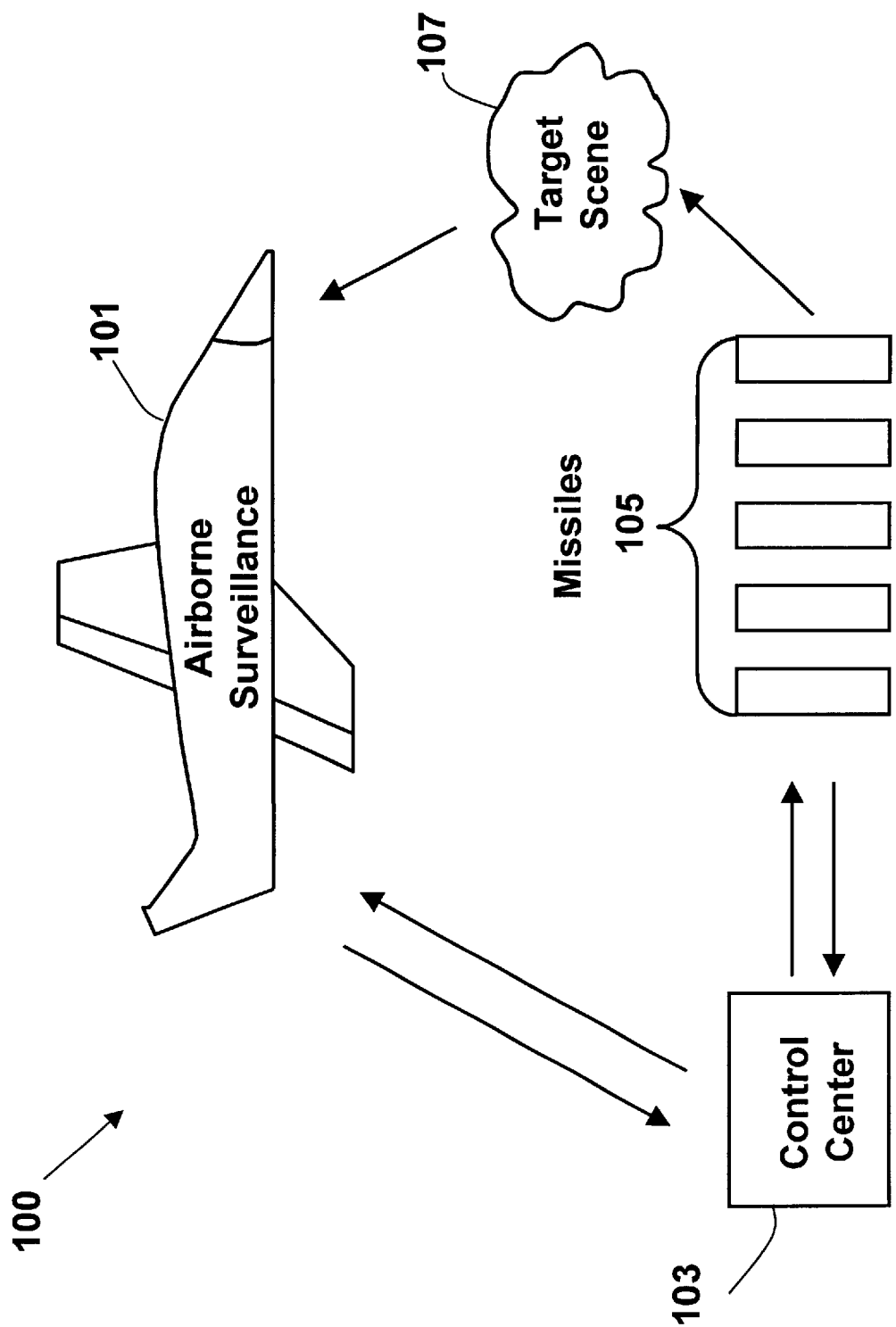
FIG. 1 shows the spatial relationship between the components of the Multispectral-Hyperspectral Sensing System.
Figure 2:
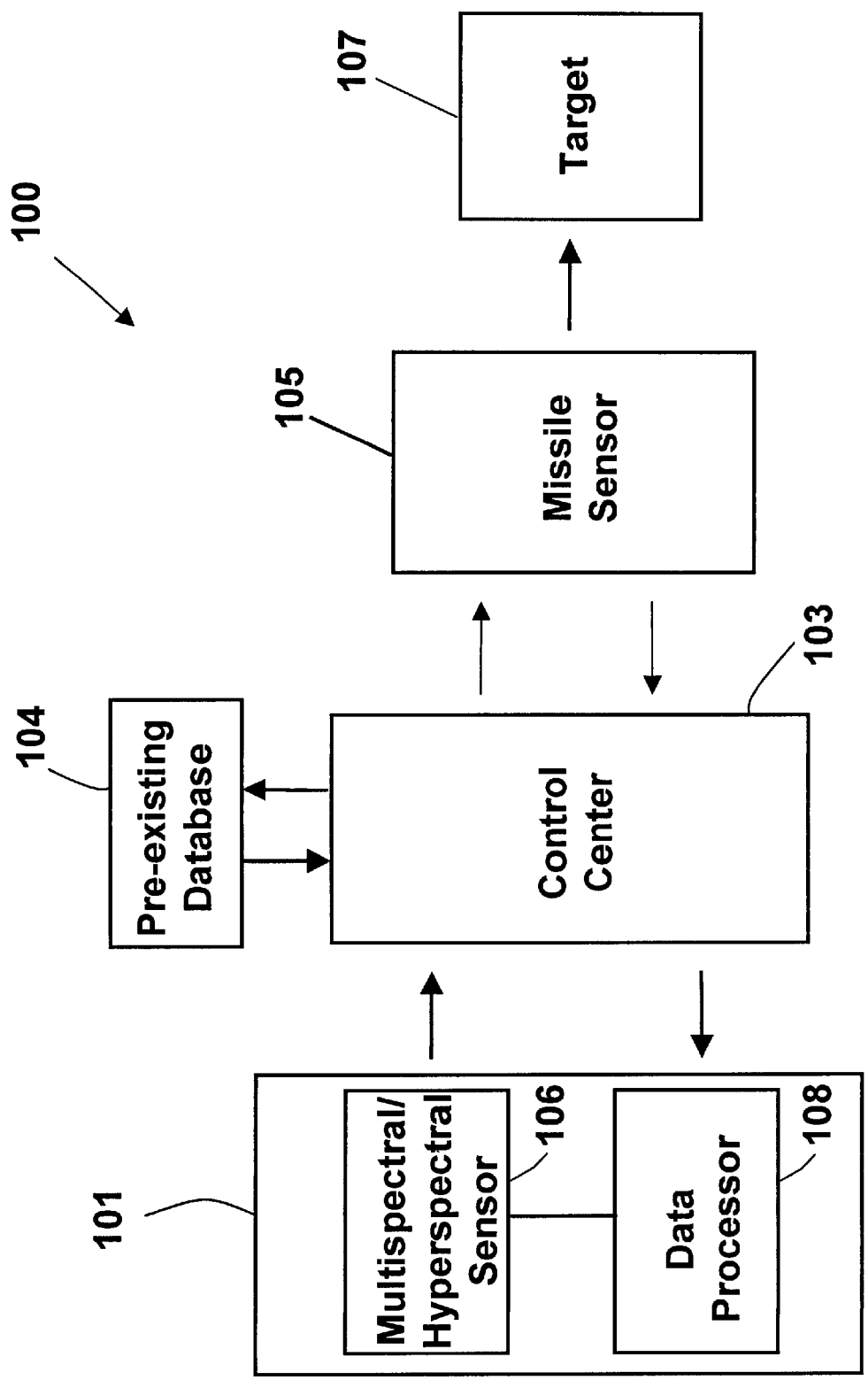
FIG. 2 illustrates the functional relationship between the components of the Multispectral-Hyperspectral Sensing System.

Now, then, referring to the drawing wherein like numbers represent like parts in each of the figures, FIG. 1 shows the over-all scheme of the MHSS 100 and the spatial relationship between the components of the system while FIG. 2 illustrates the functional relationship between the components. The MHSS is a system that reduces the dimensionality of raw, newly-acquired surveillance data of a target scene and uses it to update the knowledge base of the weapon sensor, thereby enabling the weapon to achieve heightened strike capability that is superior to that achievable by other means.

As illustrated in FIG. 2, control center 103 has access to pre-existing database 104 which relates, among others, to target spectra, terrain and material classification, topographic data, atmospheric correction for converting radiance to reflectance, the capabilities and limitations of the sensor of the available weaponry and the location of the weaponry. The control center transmits this database, to the extent practicable, to airborne surveillance platform 101, which is positioned to maintain surveillance over scene of interest 107.

The platform, which includes capability 106 to collect two-dimensional multispectral and three-or-more dimensional hyperspectral image data, collects such data of target scene 107 by scanning the scene perpendicular to the flight path of the platform. The multispectral and hyperspectral sensing capability extends from the visible to the submillimeter region, covering the solar reflectance and the thermal regions of the electromagnetic spectrum. Surveillance platform 101 also contains the capability to detect the target array and establish the spatial relationships between the detected target array and the available weaponry capable of attacking the targets. However, because typical weapon sensors have heterogeneous band coverage and the currently available data links have limited capabilities, the collection of the multispectral and hyperspectral image data of the targets is merely the beginning of the process that leads to the ultimate, precise destruction of the target. The aim is to provide the most relevant information for a current target signature update without burdening the communication links or the weapon sensors. To achieve this aim, the collected hyperspectral bands must be merged and the data contained therein processed to select from it only the discrete bands of the spectrum that offer the highest likelihood of detection and recognition by the specific sensors on the available weapons that are capable of attacking the target. The selected discrete bands further contain the location of the potential targets in relationship to those weapons.

This processing, at the surveillance platform, of the collected data is performed by data processor 108 using any of a variety of known data extraction methods. One such method involves pattern recognition algorithms using a discriminate function based either on neural network or statistical approach. Another method is combining the subset of the collected hyperspectral data that spans the single relatively broad band of the selected weapon with the hyperspectral superset to achieve the reduction in dimensionality while retaining the essential information concerning the target. It is noted that this direct linear combination of the multiband subset and normalization by the number of bands is a straightforward process; however, in order to construct an accurate broadband version of the data usable by the weapon, platform sensor anomalies between individual bands may require more explicit weighting such as non-uniformity correction or other adjustments such as bad pixel replacement. The result of the data processing using a suitable data extraction method is a data subset that is greatly reduced in its dimensionality and, correspondingly, in its bandwidth requirements yet contains the precise target information such as its classification, identification and characterization in a general class, for example, military or civilian. In the case of a mobile target, additional processing is necessary to account for the latency of the position of the target between the time of target acquisition and the time the target information is received by the weapon. Simple target coordinate prediction while making use of terrain data base information to ascertain the most probable target position will provide the most probable locations for moving targets. Following the data extraction, the data subset is compressed, taking care to minimize spatial signature distortion so as not to compromise the pattern recognition function that is implemented by the end user to perform the precision strike. This data subset is, then, transmitted via currently available data links.

Control center 103 receives the reduced-dimensional, reduced-bandwidth data and chooses, among available weaponry under its control, the one whose sensor capabilities are most compatible with the received data subset and is most advantageously located to strike the target. Then the control center re-formats the data to transform the target pose from the perspective of the airborne platform to the perspective of the ground-based weapon. The target image data may also be fused with non-image and intelligence data to obtain better discrimination. Better discrimination can be attained under environmental conditions where multiple sensor sources can measure and subsequently combine target information from different portions of the electromagnetic spectrum. Finally the re-formatted data is transmitted to the selected weapon for current target signature update, thereby enabling the weapon to achieve a more precise target strike.

Multiple control centers, each with its own unique pre-existing database and weapon batteries under its control, may be linked to the same surveillance platform. In response to the pre-existing database input from any particular control center, the data processing at the platform is done to tailor the extracted multispectral/hyperspectral data subset to the unique sensor capabilities of the weapons under the control of that particular control center as well as indicating those weapons' locations relative to the potential target. Confirmations of the receipt of information may be provided from the selected weapon to the control center and from the control center to the surveillance platform. Battle damage assessment information may be returned from the weapon engagement, thereby updating a target database which has been collected from the surveillance information previously. This allows an update of current targets needing attention or engagement.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

We claim:

1. A system for performing acquisition and a more accurate discrimination of a stationary or mobile target object in any given scene so that a closer subsequent match can be made between said target object and an end user having known requirements and thus enable a more complete contact between said target object and said end user, said system comprising: a surveillance platform, said platform being suitably positioned for surveilling a given scene and having a means for collecting hyperspectral and multispectral data of said scene and processing said data to derive therefrom a data subset, said data subset having a reduced dimensionality and being compatible with said known requirements of said end user while containing the essential information relative to said target object; a data base of pre-existing information relative to said scene and said known requirements of said end user; a control center coupled between said surveillance platform and said end user, said control center having access to said data base; and a bi-directional communication means linking said control center to said platform and said end user, said communication link enabling said center to forward said pre-exiting information to said platform so that said platform, in response, performs surveillance of pre-selected regions of said scene and returns to said center target object data that has been selectively reduced to correspond with said known requirements of said end user, said control center performing selective re-formatting of said reduced data prior to forwarding said data to said end user, thereby enabling said user to make a more complete contact with said target object.

2. A system for performing acquisition and a more accurate discrimination of a stationary or mobile target object in any given scene so that a closer subsequent match can be made between said target object and an end user having known requirements as set forth in claim 1, wherein said pre-existing information in said data base relates at least to terrain traits of said scene, atmospheric conditions, suspected nature and location of target objects in said scene, the location of said end user and the limitations of said end user's capabilities.

3. A system for performing acquisition and a more accurate discrimination of a stationary or mobile target object in any given scene to make a closer subsequent match between said target object and an end user having known requirements as set forth in claim 2, wherein said collecting and processing means on said surveillance platform comprises at least one imaging sensor, said sensor being capable of collecting two-dimensional spatial image data and three-or-more dimensional hyperspectral image data and; a data processor for performing on said collected image data feature extraction and image compression to derive from said image data a data subset that is more compatible with said limitations of said end user's capabilities and is transmissible via said communication means.

4. A method for performing acquisition and a more accurate discrimination of a stationary or mobile target object in any given scene so that a closer subsequent match can be made between said target object and an end user selected from a plurality of end users, said end users having known requirements, thereby enabling a more complete contact between said target object and said selected end user, said method comprising the steps of:

a) inputting to a surveillance platform pre-existing information relative to said given scene, potential target objects and said requirements of said plurality of end users;

b) collecting multispectral and hyperspectral image data of said scene and any target objects using said surveillance platform;

c) establishing the relationship of the location of said target objects with regard to the location of said plurality of end users;

d) processing said multispectral and hyperspectral image data to be more suitable for use by said end users;

e) selecting an end user, from said plurality of end users, most likely to benefit from said processed image data;

f) re-formatting said processed image data to be correct from said selected end user's point of view;

g) transmitting said re-formatted image data to said selected end user for target update;

h) updating the pre-existing information;

i) verifying the completion of the target update; and j) repeating the steps a) through i) as necessary until contact is made between said target object and said end user.

5. A method for performing acquisition and a more accurate discrimination of a stationary or mobile target object in any given scene so as to make a closer subsequent match between said target object and a selected end user having known requirements as described in claim 4, wherein said processing step comprises:

a) merging hyperspectral bands;

b) reducing the dimensionality of collected image data; and c) compressing the reduced data such that the target signature distortion is not compromised with respect to the pattern recognition functionality the end user implements for performing the precision strike.

6. A method as described in claim 5, wherein said re-formatting step comprises:

a) transforming target object pose from platform pose to end user pose; and b) fusing image data with non-image and intelligence data.

7. A system for performing acquisition and a more accurate discrimination of a stationary or mobile target object in any given scene to make a closer subsequent match between said target object and an end user, said end user being selected from a plurality of end users, said plurality of end users having known requirements, and thus enable a more complete contact between said target object and said selected end user, said system comprising: a surveillance platform, said platform being suitably positioned for surveilling a given scene and having a means for collecting hyperspectral and multispectral data of said scene and processing said data to derive therefrom a data subset, said data subset having a reduced dimensionality and being compatible with said known requirements of said end users while containing the essential information relative to said target object; a control center coupled between said surveillance platform and said end users, said control center having access to pre-existing information relative to said scene and said known requirements and location of said plurality of end users; and bidirectional communication means linking said control center to said platform and said end users, said communication link enabling said center to forward said pre-existing information to said platform so that said platform, in response, performs surveillance of said scene and returns to said center target object data that has been selectively reduced to correspond with said known requirements of said end users, said control center selecting an end user and performing selective re-formatting of said reduced data prior to forwarding said data to said selected end user, thereby enabling said selected end user to make a more complete contact with said target object.

8. A system for performing acquisition and a more accurate discrimination of a stationary or mobile target object in any given scene to make a closer subsequent match between said target object and an end user as set forth in claim 7, wherein said platform establishes the spatial relationship between said target object and said plurality of end users.

\* \* \* \* \*